(12) United States Patent
Egan et al.

(10) Patent No.: US 8,931,032 B2
(45) Date of Patent: Jan. 6, 2015

(54) WALL-MOUNTED DIGITAL TRANSPORT ADAPTER

(75) Inventors: Chris Egan, Parker, CO (US); Brent Robert Smith, North Vancouver (CA); Tom Lambrecht, Parker, CO (US); Perfecto D. Martinez, Castle Rock, CO (US); Kee Cheol Lee, Gyeonggi-Do (KR); Jong Woong Park, Seoul (KR)

(73) Assignee: Evolution Digital, LLC, Centennial, CO (US)

( * ) Notice: Subject to any disclaimer, the term of this patent is extended or adjusted under 35 U.S.C. 154(b) by 734 days.

(21) Appl. No.: 13/284,438

(22) Filed: Oct. 28, 2011

(65) Prior Publication Data

US 2013/0111539 A1    May 2, 2013

(51) Int. Cl.
*H04N 7/16* (2011.01)
*H05K 7/02* (2006.01)
*H04N 7/10* (2006.01)

(52) U.S. Cl.
CPC .................................. *H04N 7/106* (2013.01)
USPC ........................... 725/151; 361/809; 361/810

(58) Field of Classification Search
None
See application file for complete search history.

(56) References Cited

U.S. PATENT DOCUMENTS

| | | | |
|---|---|---|---|
| 3,845,454 A | 10/1974 | Hayward et al. | |
| 3,943,447 A | 3/1976 | Shomo, III | |
| 4,401,952 A | 8/1983 | Basawapatna | |
| 4,443,815 A | 4/1984 | Hempell | |
| 4,554,516 A | 11/1985 | Basawapatna | |
| 5,331,412 A | 7/1994 | Farmer et al. | |
| 5,384,428 A | 1/1995 | Luu | |
| 5,534,941 A | 7/1996 | Sie et al. | |
| 5,768,084 A | 6/1998 | Chaudhry et al. | |
| 5,845,190 A | 12/1998 | Bushue et al. | |
| 5,881,361 A | 3/1999 | Mannette et al. | |
| 6,038,425 A | 3/2000 | Jeffrey | |
| 6,108,331 A | 8/2000 | Thompson | |
| 6,423,900 B1 | 7/2002 | Soules | |
| 6,567,981 B1 | 5/2003 | Jeffrey | |
| 6,598,231 B1 | 7/2003 | Basawapatna et al. | |
| 6,727,775 B2 | 4/2004 | Basawapatna et al. | |
| 6,745,392 B1 | 6/2004 | Basawapatna et al. | |
| 6,973,662 B1 | 12/2005 | Sie et al. | |
| 6,983,480 B1 | 1/2006 | Sie et al. | |
| 7,024,679 B1 | 4/2006 | Sie et al. | |
| 7,027,431 B1 | 4/2006 | Thompson | |
| 7,228,559 B1 | 6/2007 | Sie et al. | |
| 7,240,359 B1 | 7/2007 | Sie et al. | |
| 7,247,793 B2 | 7/2007 | Hinkson et al. | |
| 7,322,860 B2 * | 1/2008 | Martich et al. ................ | 439/676 |

(Continued)

OTHER PUBLICATIONS

Cisco Digital Transport Adapter 50, Data Sheet, dated prior to Oct. 28, 2011, 3 pages.

(Continued)

*Primary Examiner* — Jason K Lin
(74) *Attorney, Agent, or Firm* — John R. Ley

(57) ABSTRACT

A digital transport adapter (DTA) responds to radio frequency distribution signals to extracted digital content information therefrom and to create analog television (TV) signals and high definition multimedia interface (HDMI) signals and to pass through a copy of the distribution signals. The analog TV signals, they HDMI signals and the pass through distribution signals are made available at separate connectors for use separately by customer electronic equipment. The DTA is rigidly attached to a wall overlying a wall connection box, to make it virtually impossible to remove the DTA.

22 Claims, 10 Drawing Sheets

(56) References Cited

U.S. PATENT DOCUMENTS

| | | |
|---|---|---|
| 7,436,842 B2 | 10/2008 | Binder |
| 7,453,895 B2 | 11/2008 | Binder |
| 7,563,131 B2 | 7/2009 | Sullivan et al. |
| 7,637,772 B2 * | 12/2009 | Wang .................... 439/536 |
| 7,690,022 B2 | 3/2010 | Basawapatna et al. |
| 7,747,982 B1 | 6/2010 | Sie et al. |
| 7,860,084 B2 | 12/2010 | Binder |
| 7,873,058 B2 | 1/2011 | Binder |
| 7,873,062 B2 | 1/2011 | Binder |
| 7,881,462 B2 | 2/2011 | Hazani et al. |
| 7,889,720 B2 | 2/2011 | Binder |
| 8,040,691 B2 * | 10/2011 | Yang et al. ............ 361/823 |
| 2002/0031224 A1 | 3/2002 | Basawapatna et al. |
| 2003/0099228 A1 | 5/2003 | Alcock |
| 2004/0060074 A1 | 3/2004 | Basawapatna et al. |
| 2004/0163124 A1 | 8/2004 | Basawapatna et al. |
| 2006/0001777 A1 * | 1/2006 | Araki ..................... 348/706 |
| 2006/0075447 A1 * | 4/2006 | Arashin et al. ........ 725/100 |
| 2007/0240193 A1 | 10/2007 | Sie et al. |
| 2008/0060040 A1 | 3/2008 | Jeffery |
| 2008/0274691 A1 | 11/2008 | Shafer |
| 2009/0013264 A1 | 1/2009 | Basawapatna et al. |
| 2009/0052144 A1 * | 2/2009 | Martich ................. 361/728 |
| 2009/0221179 A1 * | 9/2009 | Citurs .................... 439/536 |
| 2009/0247006 A1 * | 10/2009 | Thompson ............. 439/527 |
| 2010/0173523 A1 | 7/2010 | Magnezi et al. |
| 2010/0261374 A1 | 10/2010 | Hung |
| 2010/0308948 A1 | 12/2010 | Chapman et al. |
| 2011/0028035 A1 | 2/2011 | McAllister |
| 2011/0047583 A1 * | 2/2011 | Howard et al. ........ 725/109 |
| 2011/0072472 A1 * | 3/2011 | Wells et al. ............. 725/78 |
| 2011/0091037 A1 | 4/2011 | Pinder |

OTHER PUBLICATIONS

Motorola DTA100, Digital Transport Adapter, dated prior to Oct. 28, 2011, 1 page.

Digital Television Adapter, Wikipedia, Jan. 17, 2011, 2 pages.

HDMI, High-Definition Multimedia Interface, Wikipedia, Sep. 17, 2011, 22 pages.

* cited by examiner

WALL-MOUNTED DIGITAL TRANSPORT ADAPTER

This invention relates generally to a new and improved digital transport adapter (DTA), also known as a digital terminal adapter, a digital television adapter or a digital to analog converter. The DTA forms an interface between consumer electronic products and a high frequency signal distribution system or plant which delivers, typically by coaxial cable, radio frequency (RF) signals containing digital content information usable by consumer electronic products. More particularly, the present invention relates to a new and improved DTA which functions as a relatively low-cost, basic-featured set-top box to deliver distribution signals in multiple different forms usable by different types of consumer electronic products, and which is also capable of secure attachment to a wall in an apartment, office or other space where the DTA is used, to prevent or greatly impede the inadvertent or intentional removal and loss of the DTA.

BACKGROUND OF THE INVENTION

In the past few years in many places throughout the world, full power analog signal television (TV) transmissions have ceased to be broadcast, in preference for RF signal transmissions containing digital content information. Digital content signal transmissions offer advantages over analog content signal transmissions, including greater information content or bandwidth which leads to more programming and services, such as audio, internet service, telephone service, games, and interactive programming, as well as improved picture quality, greater protection from signal piracy, less costly infrastructure components, greater profit to signal distribution plant operators and easier compliance with regulatory constraints, among other things.

In connection with the conversion from analog to digital content information signal distribution, and in recognition of the large number of analog TV sets which are in use but no longer usable in connection with digital content distribution signals, relatively low-cost DTAs have been made available to customers so digital content distribution signals can be converted into analog content signals and used compatibly with analog TV sets. Many signal distribution plant operators have elected to provide DTAs to their customers at no cost or at a very low cost to maintain their customer base despite the move to distributing digital content signals. At the same time, the functionality of DTAs has been incorporated in relatively greater-featured and more costly set-top boxes. These greater-featured stand-alone set-top boxes are usually purchased by consumers because of their added functionality, such as program content recording, video disk playback, Multimedia Over Coaxial Alliance (MoCA) home networking capability, and other things. The customer who has purchased a stand-alone set-top box has no need for a DTA, because the stand-alone set-top box delivers all of the functionality of the DTA, and more. However, many other customers have not purchased stand-alone set-top boxes because they do not desire all of the functionality of a stand-alone set-top box or they do not wish to incur the expense of a stand-alone set-top box.

The majority of such customers who are satisfied with a basic featured DTA are usually renters who live in multiple dwelling units (MDUs), such as high-density apartments, assisted living centers, cluster and multi-family living arrangements, hotels and business office buildings. The DTA used in an MDU is a relatively small box-like device which connects to a coaxial cable wall outlet and to an analog TV set. Because the DTA requires a source of electrical power, a wall connected external power supply is also connected to the DTA. The typical DTA is frequently taped or otherwise attached to the rear of the analog TV set.

Due to the reoccurring occupancy of rented homes and offices within MDUs, and because the typical DTA is usually attached to the back of the analog TV set, it is frequently the case that the DTA is taken along with the analog TV set when the customer moves from the rented space. In many cases, the loss of the DTA is entirely unintentional, because the customer and/or mover does not realize that the DTA is not part of the customer's property. In other cases, the DTA is intentionally taken from the MDU. However, and regardless of the circumstances, the DTA is lost to the signal distribution plant operator, resulting in increased operational costs to replace lost DTAs. Even though the typical DTA is a relatively low-cost item, replacing lost DTAs can amount to a considerable expense because of the number of the DTAs placed in MDUs.

Another drawback of a conventional low-cost DTA is its capability to supply only analog signals capable of use by analog TV sets. While many customers still use analog TV sets, they are also acquiring other types of digital equipment which they desire to connect to the signal distribution plant. Examples of such digital equipment are a personal computer where access to the signal distribution plant achieves a connection to the internet, or telephone service which is achieved through a connection to the internet. Many customers have purchased high definition (HD) TV sets, but may also continue to use older analog TV sets.

SUMMARY OF THE INVENTION

The digital transport adapter (DTA) of this invention addresses and resolves the above summarized and other drawbacks of known basic-featured DTAs, and as well, offers improvements in DTAs.

The DTA of this invention is intended to be connected permanently to a wall within the space where the DTA is used, such as within a multiple dwelling unit (MDU). The DTA is retained in a manner which makes it virtually impossible for the normal customer to confuse the ownership of the DTA with his or her own property, thereby making it less likely that the signal distribution plant operator will lose the DTA if the customer moves from the space within the MDU. The features of the DTA make it very difficult or impossible for the customer to remove the DTA from its connected position on the wall. However, it is very convenient for the customer to connect and disconnect the signal cables extending from the DTA to the TV set and other digital equipment, so that the TV set and other digital equipment can be added and removed from the MDU without removing the DTA.

The DTA also provides the capability to deliver high definition multimedia interface (HDMI) signals for use by HDMI-compatible consumer electronic equipment. The DTA also delivers distribution signals from the signal distribution plant for direct use by digital equipment. Both the HDMI and the direct distribution signals are supplied in addition to the analog TV signal. Consequently, the customer has the ability to connect the DTA to numerous and diverse types of equipment that respond to digital content signals as well as to conduct upstream signals into the signal distribution plant to achieve communication over the internet, for example.

The DTA is capable of operating from DC power supplied over the coaxial cable of the signal distribution plant or from an external power supply connected to a conventional electrical outlet. The DTA has the capability of operating from the more consistent quality voltage of an external power supply, compared to variable voltage power available from variable length cables within the signal distribution plant. However, when the DTA operates from coaxial cable supplied DC power, the variable voltage power is converted to a level to achieve reliable functionality of the electronic components of the DTA.

Certain function selectivity of the DTA is hidden to prevent tampering with that functionality by the customer. The hidden function selectivity reduces the risk that the customer may cause problems that the signal distribution plant operator can only correct by sending a technician to the customer's premises in a relatively expensive service call or "truck roll." On the other hand, the DTA provides indications of functionality which demonstrate proper operation of the DTA, and which, under appropriate instructions delivered by telephone from the signal distribution plant operator, may lead the customer to rectify certain types of functional problems that might occasionally occur, without the need for a service call.

The structural configuration of the DTA directs the cables that connect to it so that neither the DTA nor the cables present significant clearance problems when positioning the TV set, digital equipment and furniture adjacent to the DTA. The attachment of the DTA to the wall does not create an unattractive or tangled collection of signal conducting cables and other conductors.

The DTA of the present invention which achieves the above and other desirable characteristics responds to radio frequency digital content information distribution signals conducted by an infrastructure cable of a signal distribution plant, and is operative to deliver signals containing the digital content information to customer equipment. A first connector of the DTA is adapted to connect to the infrastructure cable by which to receive the distribution signals. A signal splitter of the DTA is connected to receive the distribution signals from the first connector and to split the distribution signals into a first copy and a second copy. A second connector of the DTA is adapted to connect to the customer equipment such as digital equipment. The second connector receives the first copy of the distribution signals from the signal splitter and supplies the first received copy to the connected customer equipment. Electronic components of the DTA receive the second copy of the distribution signals from the signal splitter and extract the digital content information from the second copy of the distribution signals. The extracted digital content information is used to create analog television (TV) signals and high definition multimedia interface (HDMI) signals. A third connector of the DTA is adapted to connect to the customer equipment such as an analog TV set. The third connector receives the analog TV signals and supplies them to the customer equipment connected to the third connector. A fourth connector is adapted to connect to the customer equipment such as HDMI-compatible equipment. The fourth connector receives the HDMI signals and supplies the HDMI signals to the customer equipment connected to the fourth connector.

In many cases, the customer equipment connected to the second connector is digital equipment capable of initiating upstream signals compatible with the distribution signals conducted by the signal distribution plant. In such circumstances, the second connector is also adapted to receive the upstream signals from the digital equipment connected to the second connector and to supply the upstream signals to the signal splitter. The signal splitter conducts the upstream signals to the first connector, and the first connector supplies the upstream signals to the infrastructure cable for delivery to the signal distribution plant.

It is desirable to attach the DTA to a wall by at least one fastener which rigidly connects to the wall. In such circumstances, the DTA includes a base plate having a structural configuration adapted to connect to the one fastener to rigidly attach the base plate to the wall, and an exterior cover which rigidly attaches to the base plate and which overlies the one fastener. The wall connection typically includes a wall connection box within which an end of the infrastructure cable is located. The one fastener extends between the wall connection box and the base plate to rigidly attach the base plate to the wall in a position which overlies the wall connection box. Preferably, the first connector is connected to the base plate in a position to extend into the wall connection box when the base plate is rigidly attached to the wall in the position which overlies the wall connection box, and the first connector connects to the end of the infrastructure cable within the wall connection box.

To assist in maintaining the rigid connection of the base plate to the wall, a plurality of projections are formed on the exterior cover to overlap edges of the base plate at a location adjacent the wall when the base plate is rigidly attached to the wall. An extension of the exterior cover into the interior space connects to and is retained rigidly to the wall by the fastener. A tab extends from the exterior cover into adjacency with the base plate. A hook-like projection extends from the tab into a hole formed in the base plate when the exterior cover is rigidly attached to the base plate.

Electronic components within the DTA may include a selection switch having a movable element for operating the selection switch. The base plate preferably includes an opening which is located facing the wall when the base plate is rigidly attached to the wall in the position which overlies the wall connection box. The movable switch element is positioned within the opening for movement to operate the selection switch and to make the movable switch element inaccessible for movement when the base plate is rigidly attached to the wall. The selection switch is connected to a modulator to select one of the plurality of different analog TV channel frequencies in accordance with the position of the movable switch element. The modulator delivers the analog TV signals at a selected one of a plurality of different channel frequencies in accordance with the position of the movable switch element.

In circumstances where the infrastructure cable carries cable-delivered electrical power in addition to the distribution signals, the DTA further includes a power receptacle connected to the base plate. The power receptacle is adapted to receive external electrical power for the internal electronic components of the DTA. A divider of the DTA is connected to the first connector to receive the cable-delivered electrical power and the distribution signals from the infrastructure cable. The divider separates the cable-delivered electrical power from the distribution signals, and the divider supplies the distribution signals to the splitter. A power switching circuit of the DTA is connected to the divider to receive cable-delivered power. The power switching circuit is also connected to the power receptacle to receive external electrical power. The power switching circuit supplies the external electrical power to the electronic components whenever external electrical power is available at the power receptacle and supplies the cable-delivered power to the electronic components whenever external electrical power is not available at the power receptacle.

In addition it is preferable that a converter of the DTA receives the cable-delivered power from the divider and operatively adjusts the level of the cable-delivered power received at the first connector to compensate for the variable nature of the cable delivered power available at the first connector as a result of power losses due to the length of the infrastructure cable.

The inventive aspects of the DTA are described specifically in the appended claims. A more complete appreciation of the inventive aspects and their scope, as well as the manner in which they constitute improvements and other benefits, can be obtained by reference to the following detailed description of presently preferred embodiments of the invention and from the accompanying drawings, which are briefly summarized below.

DETAILED DESCRIPTION

Figure 1:
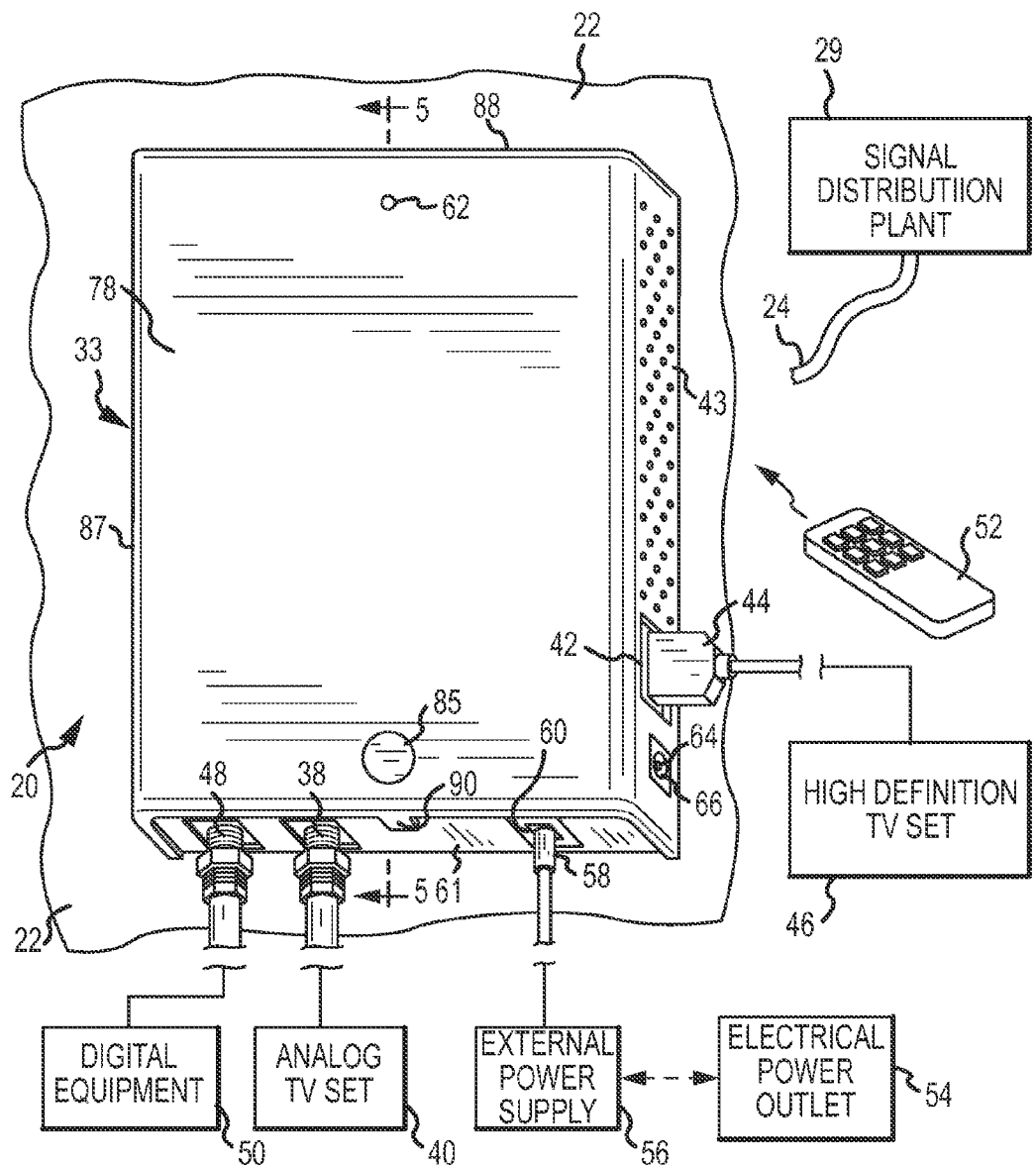
FIG. 1 is a perspective view of a digital transport adapter (DTA) which embodies the present invention, shown connected to a wall and to consumer electronic equipment shown in block diagram form.
Figure 2:
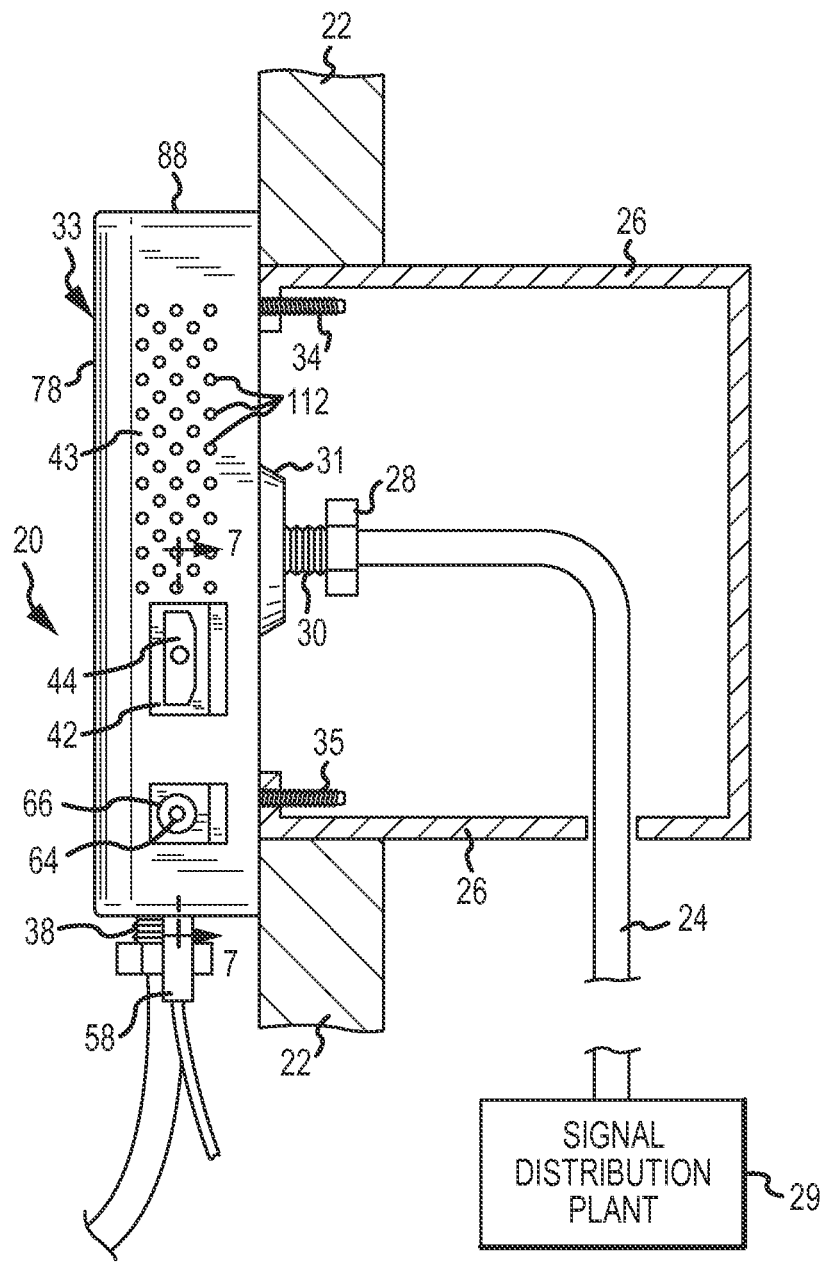
FIG. 2 is a side elevation view of the DTA shown in FIG. 1, with a portion of the wall and a wall connection box shown in vertical section.
Figure 3:
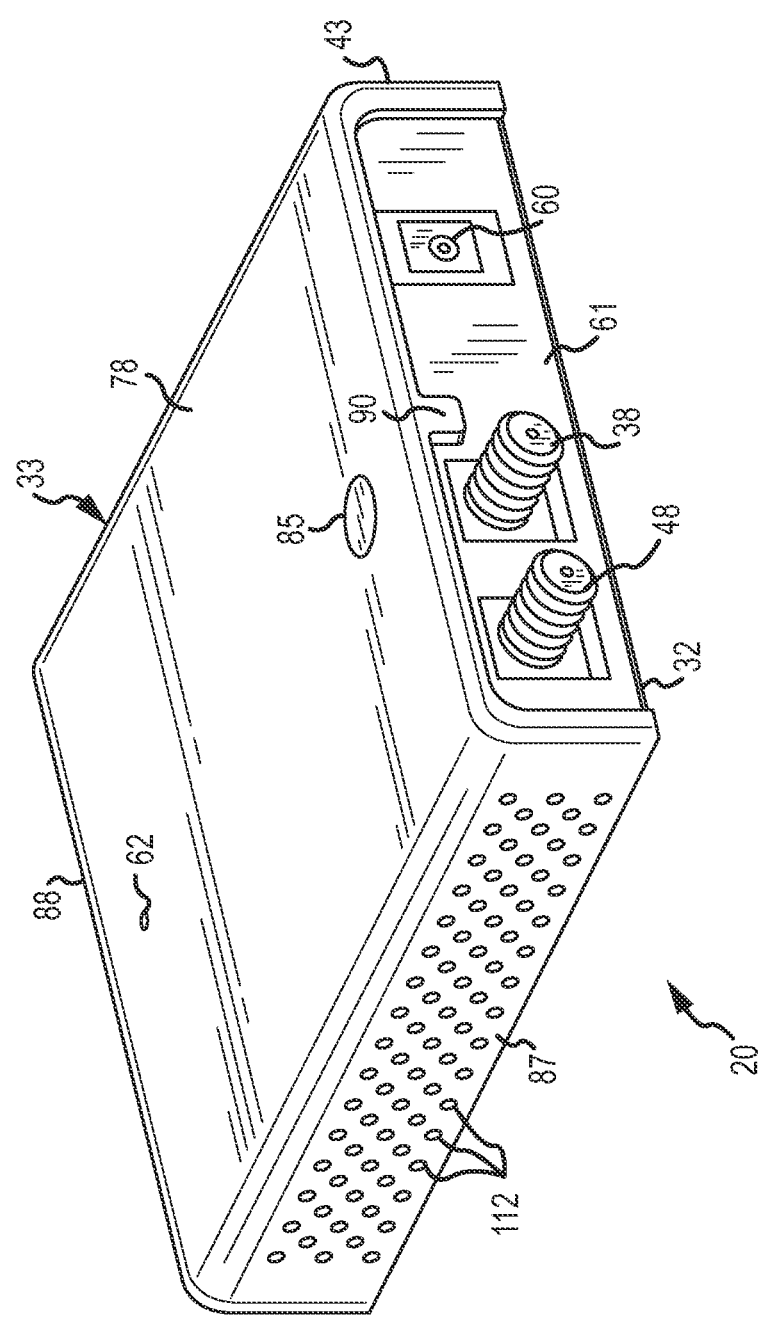
FIG. 3 is a perspective view of the DTA shown in FIG. 1 from the front, bottom and left hand sides.

A digital terminal adapter (DTA) 20 which incorporates the invention is shown in FIGS. 1, 2 and 3. The DTA 20 is shown attached to a wall 22 in a space where it is used, such as an apartment or other living or office space within a multiple dwelling unit (MDU). The DTA 20 is attached to the wall 22 in a manner which makes it virtually and practically impossible for a customer to remove the DTA 20 from the wall 22.

Figure 4:
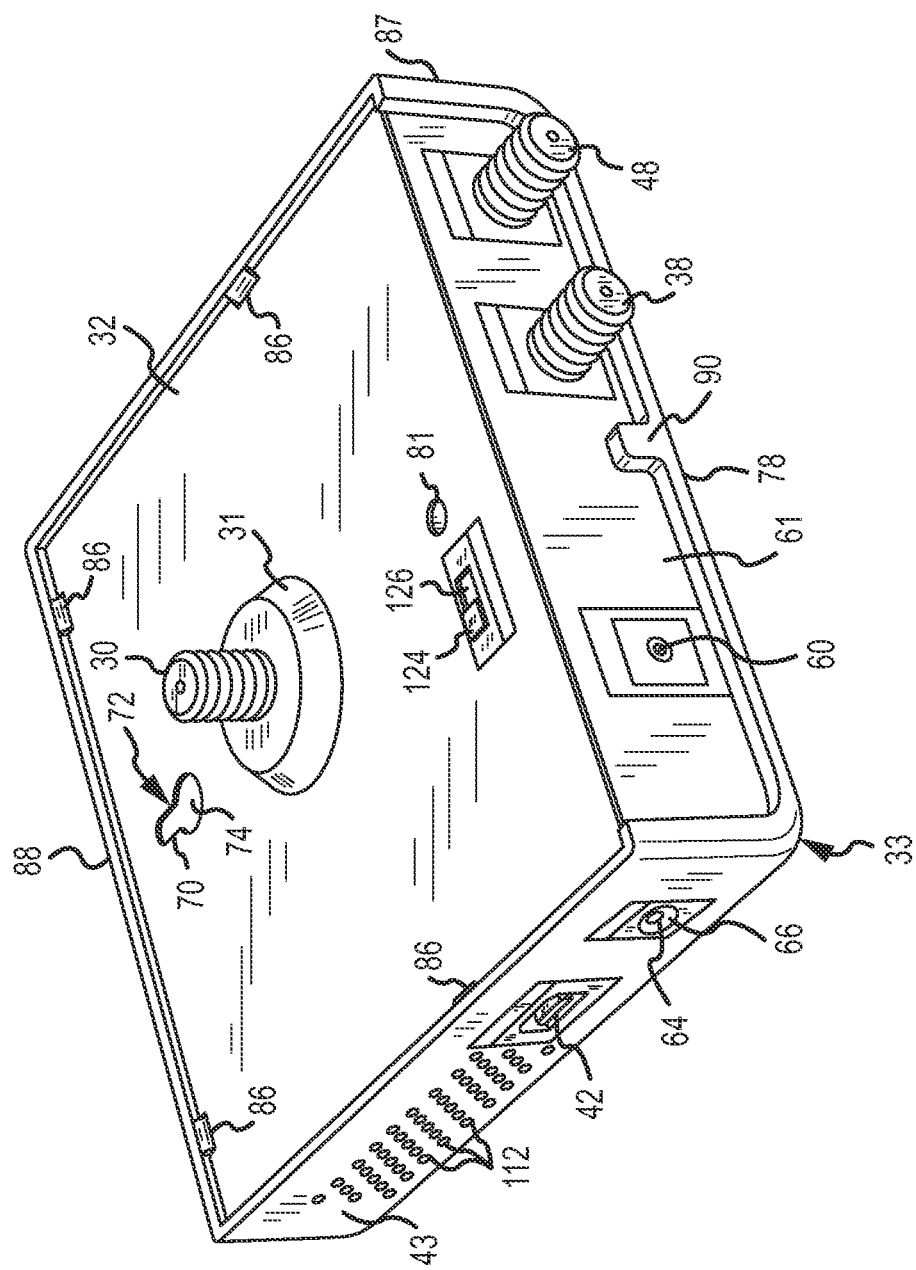
FIG. 4 is a perspective view of the DTA shown in FIG. 1 from the rear, bottom and right hand sides.
Figure 5:
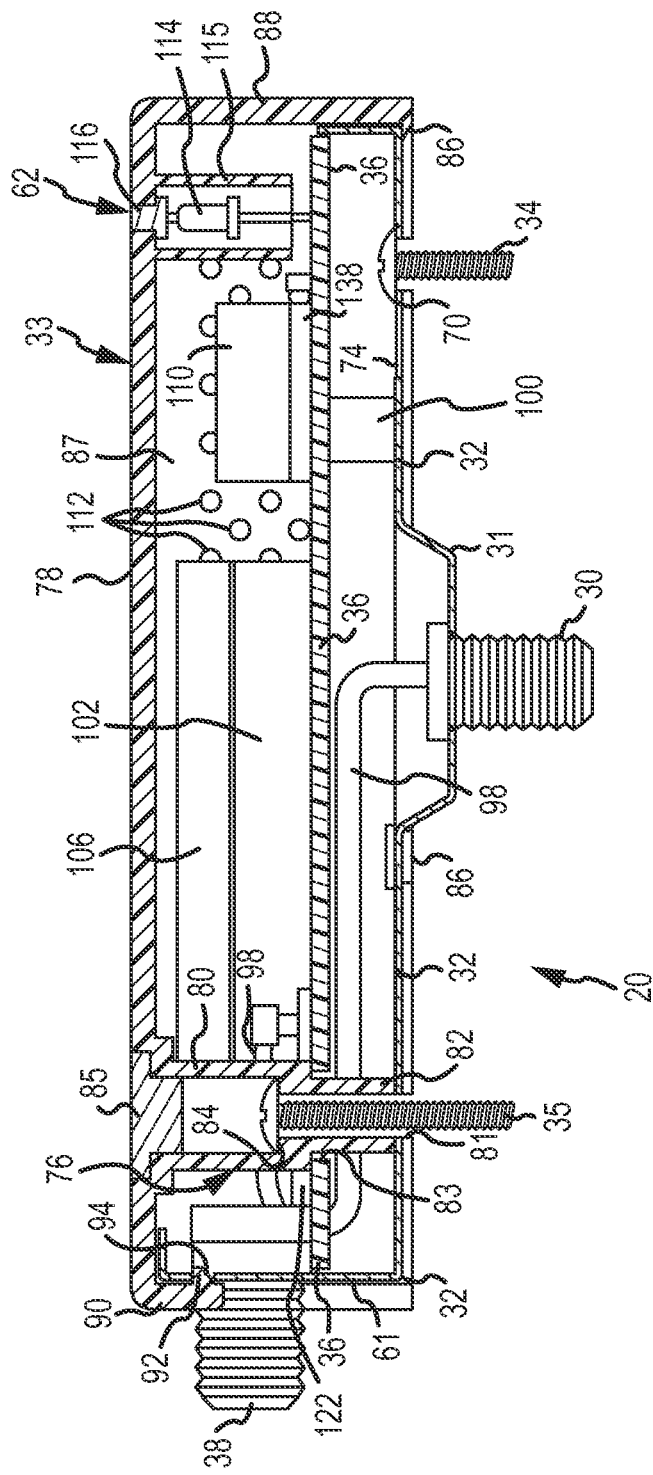
FIG. 5 is an enlarged vertical section view of the DTA shown in FIGS. 1 and 2, taken substantially in the plane of line 5-5 shown in FIG. 1.

As shown in FIG. 2, the DTA 20 is connected to a coaxial cable 24 which extends within and behind the exterior surface of the wall 22 of the MDU. The end of the coaxial cable 24 is located in a conventional single gang wall connection box 26. The connection box 26 is retained in the wall 22 in the conventional manner. A conventional coaxial cable connector 28 on the end of the cable 24 connects to a conventional F type coaxial connector 30 which is located on a rearward projected or raised portion 31 of a base plate 32 (FIGS. 4-6) of the DTA 20. The base plate 32 is held in firm adjacency to the wall 22 by an upper attachment screw 34 and a lower attachment screw 35 (FIG. 5). An exterior cover 33 fits over and attaches to the base plate 32.

The coaxial cable 24 is part of a signal distribution plant 29 over which by a signal distribution plant operator supplies radio frequency (RF) distribution signals containing digital content information. In some circumstances the customer equipment is capable of transmitting upstream signals back to the equipment of the signal distribution plant operator. Generally speaking, the signal distribution plant 29 will be formed by multiple coaxial cables connected in a branching manner, but not all of the signal conductors in the signal distribution plant have to be coaxial cables. Certain portions of the signal distribution plant 29 may be formed by optical and radio frequency signal links. However in MDU's and other customer premises, the last extent of the signal distribution plant infrastructure is typically a coaxial cable, such as that shown at 24, and for this reason, the coaxial cable 24 and is sometimes referred to below as the infrastructure coaxial cable 24. Similarly, the coaxial connector 30 which connects to the infrastructure coaxial cable 24 is sometimes referred to below as the infrastructure coaxial connector 30.

Figure 6:
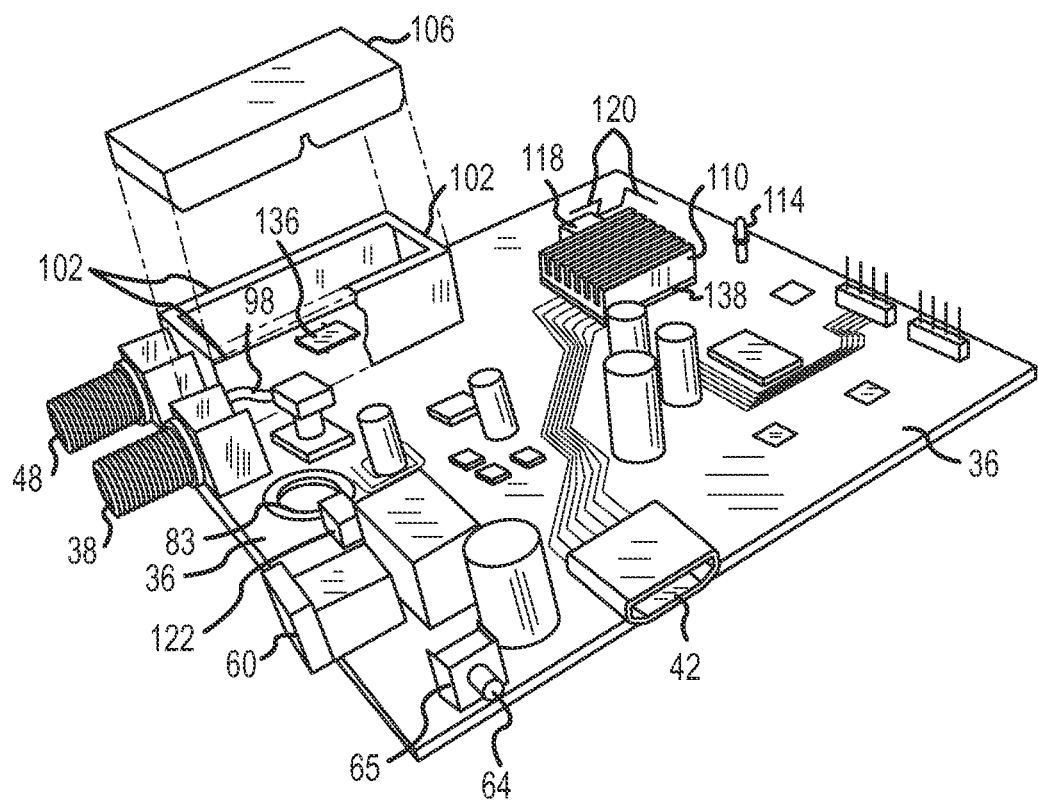
FIG. 6 is a generalized perspective view of a printed circuit board and other internal electronic components of the DTA shown in FIG. 5.
Figure 7:
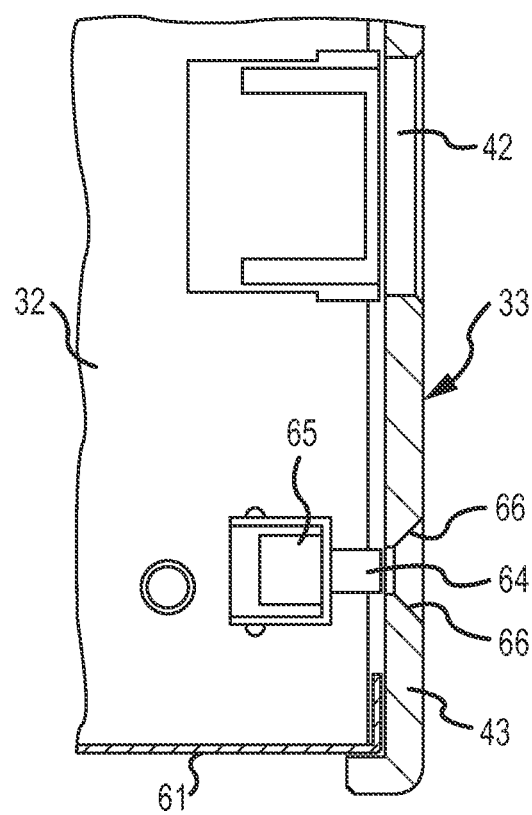
FIG. 7 is a partial section view taken substantially in the plane of line 7-7 of FIG. 2, showing details within the lower right-hand corner of the DTA shown in FIGS. 1-5.

Distribution signals from the signal distribution plant 29 are supplied over the infrastructure coaxial cable 24 and are received, conducted and processed by internal electronic components of the DTA 20 (FIGS. 8-10) which are attached to an internal printed circuit board (PCB) 36 of the DTA 20 (FIGS. 5 and 6). The internal electronic components of the DTA 20 are principally located between the base plate 32 and the exterior cover 33 (FIG. 5). The exterior cover 33 protects the internal electronic components and creates an attractive exterior appearance of the DTA 20.

The internal electronic components of the DTA convert the digital content distribution signals from the infrastructure coaxial cable 24 into an analog TV signal (150, FIG. 8), which is then supplied from a conventional F type coaxial cable connector 38 to a conventional analog TV set 40. The conversion allows the conventional analog TV set 40 to display digital content information supplied over the infrastructure coaxial cable 24 and the signal distribution plant 29. The cable connector 38 is sometimes referred to below as the analog coaxial connector 38 because it delivers the analog TV signal.

The internal electronic components of the DTA 20 also convert the digital content distribution signals from the infrastructure coaxial cable 24 and the signal distribution plant 29 into the well-known high definition multimedia interface (HDMI) format, and those HDMI signals (144, FIG. 8) are supplied to a conventional HDMI connector receptacle 42 located on a right-hand side 43 of the cover 33 (as shown in FIG. 1). A conventional HDMI mating connector plug 44 is inserted into the HDMI mating receptacle 42 to connect a conventional a HD TV set 46 to the DTA 20. The HD TV set 46 is one example of HDMI-compatible customer equipment which responds to HDMI signals. Any such type of HDMI equipment which responds to the HDMI signals can be connected to the HDMI connector receptacle 42.

The DTA 20 includes another F type coaxial connector 48 which conducts the digital content distribution signals from the infrastructure coaxial cable 24 to digital equipment 50 and which conducts compatible upstream signals from digital equipment 50 back through the DTA 20 the infrastructure coaxial cable 24 and the signal distribution plant 29. Examples of such digital equipment 50 include personal computers connected to the internet, interactive games, telephone service, and the like. Typically the digital equipment 50 will include a modem for demodulating the downstream distribution signals from the radio frequency that the distribution signals are transmitted over the signal distribution plant 20 to a form usable by the digital equipment, and for modulating any upstream signals created by the digital equipment 50 into a form compatible with the distribution signals for transmission through the signal distribution plant 20. The coaxial connector 48 constitutes an outlet for the digital content distribution signals passing through the DTA 20, and for that reason is sometimes referred to below as the pass-through coaxial connector 48.

In the manner just described, the DTA 20 supplies conventional analog TV signals usable with older conventional analog TV sets 40, modern HDMI signals usable with modern HD TV sets 46 and other HDMI-compatible customer equipment, and digital content distribution signals from the infrastructure coaxial cable 24 and signal distribution plant 29 for use by digital equipment 50 that directly responds to the digital content distribution signals. The pass-through coaxial connector 48 also creates an inlet port to the signal distribution plant for use by customer digital equipment 50 which generates and supplies its own upstream signals, such as those involved in internet communications from a personal computer. The DTA 20 is therefore usable with a variety of different customer equipment, and is not limited to one particular use such as for converting digital content distribution signals into analog TV signals. The capability of connecting to and using the signal distribution plant is a very desirable feature for most customers of signal distribution services, and the DTA 20 delivers that capability.

The DTA 20 also delivers basic operational and programming features associated with a set-top box, such as remote control program selection. A remote control unit 52 is manipulated by the customer to send control signals from a transmitter (not shown) in the remote control unit 52 to a receiver (118, FIG. 8) of a remote controller (152, FIG. 8) within the DTA 20. The remote controller is one of the internal electronic components attached to the PCB 36 (FIGS. 5 and 6). The remote control functionality is accomplished by transmitting either RF or optical signals from the transmitter of the remote control unit 52 to the remote controller (152, FIG. 8) within the DTA 20.

The internal components of the DTA 20 (FIGS. 5, 6 and 8-10) require direct current (DC) electrical power to operate. The DTA 20 is capable of receiving DC electrical power from a conventional external power supply 56 which converts alternating current (AC) electrical power from an outlet 54 into DC power at a voltage level compatible for use with the internal electronic components of the DTA 20. The electrical power from the external power supply 56 is delivered through a DC power supply plug 58 which is inserted within a conventional DC power receptacle 60.

The DTA 20 will also operate from DC power supplied from the infrastructure coaxial cable 24. The RF distribution signals and the DC power coexist on the same infrastructure coaxial cable 24. The presence of electrical power supplied on the infrastructure coaxial cable 24 and the presence of electrical power supplied by the external power supply 56 to the power receptacle 60 is distinguished, and the DTA 20 operates from DC power from external power supply 56 whenever such power is available. The DTA 20 operates from DC power supplied from the infrastructure coaxial cable 24 whenever DC power is not available from the external power supply 56.

An end portion 61 of the base plate 32 is turned up to form a bottom side of the DTA 20. The analog coaxial connector 38, the pass-through coaxial connector 48 and the power receptacle 60 are all connected to the end portion 61. The end portion 61 extends generally horizontally and faces downwardly, to position the coaxial connectors 38 and 48 and the power receptacle 60 in a downward facing position. The downward facing position facilitates connecting cables to the coaxial connectors 38 and 40 and receptacle 60 with the cables extending downward and parallel to the wall 22. Not only does this orientation of the coaxial connectors 38 and 40 and the receptacle 60 create a neater appearance in the orientation of the cables, but the downward orientation of the cables parallel to the wall 22 does not inhibit the placement of consumer electronic equipment or furniture adjacent to the DTA 20.

An indicator 62 is positioned to be visible at the exterior cover 33 of the DTA 20. The indicator 62 signals the condition of operation and/or status of the DTA. Preferably the indicator 62 provides a visual indication of a proper operating condition or status, as well as indications of a malfunction or an inoperative condition or status, by emitting different colors and patterns light. From these indications, the customer can quickly recognize the status of operation of the DTA. If some inoperative condition or malfunction should occur, the customer can telephone the signal distribution plant operator for instructions of how to resolve the problem or to provide reliable information to the signal plant distribution operator of the extent and nature of the problem. The indicator 62 offers the possibility that the customer can correct a problem or operational condition with instructions from the distribution plant operator, and thereby save the distribution plant operator the expense of a service call.

To facilitate the customer correcting certain errors and operational status conditions, a reset button 64 connected to a reset switch 65 (FIGS. 6-8) which is located on the right-hand side 43 of the cover 33 of the DTA, as shown in FIGS. 1, 2, 4, 6 and 7. The reset button 64 is located within a recess 66 (FIG. 7) formed in the right hand side 43 of the cover 33. The recess 66 prevents inadvertent contact with the reset button 64, and instead requires a definite, intentional depression by the customer, perhaps with the use of a narrow tool to fit into the recess 66 if the customer's finger is too large to activate the reset button 64 within the recess 66. A definite affirmative depression of the reset button 64 will reset or restart the functionality of a central processing unit (CPU)/decoder (138, FIG. 8) which controls the functionality of the DTA. A reset may eliminate a hang or suspension in the execution of programmed instructions by the CPU/decoder.

The internal mechanical aspects of the DTA 20 which hold it in place on the wall 22 are shown principally in FIG. 5. The upper attachment screw 34 (FIGS. 2 and 5) is located in a slot portion 70 of a conventional keyhole opening 72 formed at a top laterally centered location in the base plate 32 of the DTA 20, as shown in FIG. 4. A large round portion 74 of the keyhole opening 72 has a sufficient diameter to allow the head of the upper attachment screw 34 to pass through that portion 74. Once the head of the upper attachment screw 34 has been inserted through the larger round portion 74, the DTA 20 is moved downward to position the shank portion of the attachment screw 34 immediately below the head of that screw 34 into the slot portion 70. The slot portion 70 has less width than the width of the head of the attachment screw, causing the head of the attachment screw to contact the front side of the base plate 32. With the head of the upper attachment screw firmly in the slot portion 70 of the keyhole opening 72, and with the upper attachment screw 34 threaded into the wall connection box 26 until there is just enough clearance between the head of the screw 34 and the outer surface of the wall 22 to accept the base plate 32 therebetween, the minimal clearance between the head of the upper attachment screw 34 and base plate 32 at the slot portion 70 holds the upper portion of the base plate closely adjacent to the wall 22.

The lower attachment screw 35 extends through a hollow stepped sleeve 76 which is integrally formed with a front portion 78 of the exterior cover 33. The stepped sleeve 76 extends rearwardly from the front portion 78 of the exterior cover 33. The stepped sleeve 76 includes a first portion 80 which defines an inside cylindrical opening that is slightly larger than the diameter of the head of the lower attachment screw 35. A second portion 82 of the stepped sleeve 76 extends rearward from the first portion 80. The second portion 82 extends through a hole 83 (FIGS. 5 and 6) formed in the PCB 36. The second portion 82 of the stepped sleeve 76 has a length sufficient to reach through the hole 83 in the PCB 36 (FIG. 5) and contact the base plate 32. An inside cylindrical opening formed in the second portion 82 has a diameter slightly larger than the threaded shank of the lower attachment screw 35. The cylindrical opening in the second portion 82 aligns with a hole 81 (FIGS. 4 and 5) formed through the base plate 32 when the second portion contacts the base plate. The transition between the first and second portions 80 and 82 of the stepped sleeve 76 creates a shoulder 84 which the head of the lower attachment screw 35 contacts when the screw 35 is tightened.

The lower attachment screw 35 is inserted within the hollow stepped sleeve 76 and the hole 81 in the base plate 32, and is inserted in the threaded receptacle in the wall connection box 26. The lower attachment screw 35 is then tightened until the head of the screw 35 contacts the shoulder 84 and forces the second portion 82 of the stepped sleeve 76 into contact with the base plate 32. Simultaneously, the tension from the tightened screw 35 forces the base plate 32 into rigid contact with the wall 22. The rigid contact of the base plate 32 with the wall holds the DTA 20 in position.

When the DTA 20 is attached to the wall 22 in the described manner, the infrastructure coaxial connector 30 and the projection portion 31 of the base plate 32 are located within the wall connection box 26, as shown in FIG. 2. The infrastructure coaxial cable 24 is connected to the infrastructure coaxial connector 30 by screwing the coaxial cable connector 28 onto the threads of the infrastructure coaxial connector 30 before the DTA 20 is attached to the wall. The end of the infrastructure coaxial cable 24 is pulled out sufficiently from the wall connection box 26 to tighten the coaxial cable connector 28 onto the infrastructure coaxial connector 30. Thereafter the DTA 20 is connected to the wall connection box 22 using the attachment screws 34 and 35.

Once the lower attachment screw 35 has been tightened sufficiently to hold the DTA 20 in place on the wall 22, a plug 85 (FIGS. 1 and 5) is inserted within the interior of the first portion 80 of the stepped sleeve 76. The plug 85 is formed of elastomeric material and has sufficient resilience to compress slightly and thereby frictionally hold itself in place within the cylindrical opening of the first portion 80 of the stepped sleeve 76 at the exterior surface of the front portion 78 of the cover 33.

As an alternative to the plug 85, an adhesive security seal can be placed over the cylindrical opening defined in the cover 33 by the first portion 80 of the stepped sleeve 76. The adhesive of the security seal holds it firmly in place covering the cylindrical opening. Removal of the security seal indicates unauthorized tampering with the DTA. If the signal distribution plant operator is required to perform a service call under circumstances where the security seal has been disrupted, the user may be charged for that service call.

The exterior cover 33 is maintained in attachment with the base plate 32 by the lower attachment screw 35 pressing the stepped sleeve 76 against the base plate 32, as shown in FIG. 5, as well as by multiple overlapping projections 86 which extend inward from the lateral sides 43 and 87 and a top side 88 of the exterior cover 33, as shown in FIG. 4. Each of the projections 86, as shown in FIG. 5, overlaps the transverse lateral and upper peripheral edges of the base plate 32, thereby preventing the cover 33 from moving outward away from the base plate 32. The cover 33 is prevented from moving backward away from the base plate 32 by its contact with the surface of the wall 22, when the DTA 20 is attached to the wall.

A tab 90 extends rearward from the lower edge of the front portion 78 of the exterior cover 33 at a point approximately laterally midway between the right and left sides 43 and 87 of the exterior cover 33, as shown in FIGS. 1 and 3-5. The tab 90 overlies the end portion 61 of the base plate 32 at a bottom side of the DTA 20, as shown in FIG. 5. A hook-like projection 92 extends rearward from the tab 90 through a hole 94 in the end portion 61 of the base plate 32. The hook-like projection 92 deflects slightly outward when the cover 78 is attached to the base plate 32 as the projection 92 moves along the end portion 61 until the projection 92 aligns with the hole 94. At that point, the hook-like projection 92 deflects into the hole 94 to hold the bottom edge of the front portion 78 of the exterior cover 33 to the end portion 61 of the base plate 32. In a similar manner, the left and right sides 43 and 87 and the top side 88 of the exterior cover 33 are deflected outward slightly to allow the projections 86 to move over the peripheral edges of the base plate 32 and then return to a normal position in which the projections 86 overlap the edges of the base plate 32. The exterior cover 33 is preferably made of resilient plastic material which permits the described amount of deflection. In this manner, the projections 86 and the tab 90 with its hook-like projection 92 firmly attach the exterior cover 33 to the base plate 32. Of course, the exterior cover 33 is also held firmly to the base plate by the lower attachment screw 35 when tightened in the manner described.

If the projections 86 are forced away from their overlapping relationship with the top, left and right sides of the base plate 32, and the exterior cover 33 is broken away from the stepped sleeve 76, and the tab 90 is broken to allow the hook-like projection 92 to separate from the hole 94, the upper attachment screw 34 is still not visible to the person attempting to remove the DTA 20 from the wall 22. Locating the head of the upper attachment screw 34 beneath the PCB 36 (FIG. 5) obscures that screw from view even if the exterior cover 33 is removed. A person making an unauthorized attempt to remove the DTA from the wall will not know that the base plate 32 can be removed from the upper attachment screw 34 through the keyhole opening 72, unless the individual has prior knowledge of the existence of the keyhole opening 72. These features are instrumental in discouraging and prohibiting the removal of the DTA 20 from the wall.

As shown in FIGS. 5 and 6, the coaxial connectors 38 and 48, the power receptacle 60, the HDMI connector receptacle 42, the reset button 64 and reset switch 65, and the indicator 62, are attached to the PCB 36. A miniature coaxial cable 98 conducts distribution signals between the infrastructure coaxial cable 24 and the components of the PCB 36. Multiple spacers 100 (only one is shown in FIG. 5) support the PCB 36 and its attached components above the base plate 32. The miniature coaxial cable 98 extends between the PCB 36 and the base plate 32.

The base plate 32 is electrically connected to the wall connection box 26 through the upper attachment screw 34. Typically, the wall connection box 26 is electrically connected to earth ground through a separate electrical connector (not shown). The base plate 32 forms an electrical Faraday shield to inhibit electrical noise originating from behind the DTA 20 from interfering with the proper functionality of the high-frequency components on the PCB 36. The components attached to the front side of the PCB 36 are shielded from electrical noise originating on the front side of the PCB 36 by a shielding housing 102. The shielding housing 102 forms a Faraday shield surrounding certain high-frequency components connected to the pass-through coaxial connector 48 (items 48, 132, 134, 136, FIG. 8), to prevent external noise from adversely influencing the high-frequency distribution signals conducted by these components. The high-frequency distribution signals are the most susceptible to adverse influences from external noise, so the electronic components which conduct that signal are principally shielded by the housing 102 and the miniature coaxial cable 98.

The shielding housing 102 has a removable cover 106, which allows access to the components inside the shielding housing 102 without the need to remove the housing 102. The removable cover 106 also facilitates attaching the shielding housing 102 to the PCB 36, without disturbing the components otherwise connected to the PCB 36. Small air ventilation holes are formed in the shielding housing 102 and/or the removable cover 106 to allow air circulation and removal of heat from the electronic components shielded within the housing 102.

Other electronic components attached to the PCB 36 may require the use of a heat sink 110 to dissipate the heat generated from such components. Air circulates through the DTA 20 as a result of ventilation holes 112 formed in the left and right sides 43 and 87 of the exterior cover 33 (FIGS. 1-5).

The analog coaxial connector 38 and the pass-through coaxial connector 48 are both attached to the PCB 36 adjacent to the position of the end portion 61 of the base plate 32. The coaxial connectors 38 and 48 are attached on the upper side of the PCB 36 (as shown), so that they extend parallel to and are spaced from the wall 22 when the DTA 20 is attached to the wall 22 (FIG. 2). The spacing from the wall facilitates connecting coaxial cables to the coaxial connectors 38 and 48, because there is space below the connectors 38 and 48 to extend fingers and a wrench when making the connection. A similar situation exists with respect to the HDMI connector receptacle 42. The HDMI connector receptacle 42 is also spaced from the wall 22 when the DTA 20 is connected, thereby allowing the mating HDMI connector plug 44 to be firmly gripped by finger pressure when inserting it into and removing it from the HDMI connector receptacle 42.

The indicator 62 is preferably formed by a light emitting diode (LED) 114 which is attached to the PCB 36. A sleeve 115 extends downward from the front portion 78 of the exterior cover 33 toward the PCB 36 and surrounds the LED 114. The length of the sleeve 115 allows the LED 114 to be attached closely adjacent to the PCB 36, thereby avoiding the necessity for a relatively long leads on the LED 114 and a relatively high and flexible position of the LED above the PCB 36. The sleeve 115 causes most of its light from the LED 114 to be directed through a lens 116 which is positioned at the front portion 78 of the exterior cover 33. The lens 116 concentrates the light within the sleeve 115 into a higher intensity beam which is directed through a small opening in the cover 33, thereby enhancing the intensity of the indication.

Figure 8:
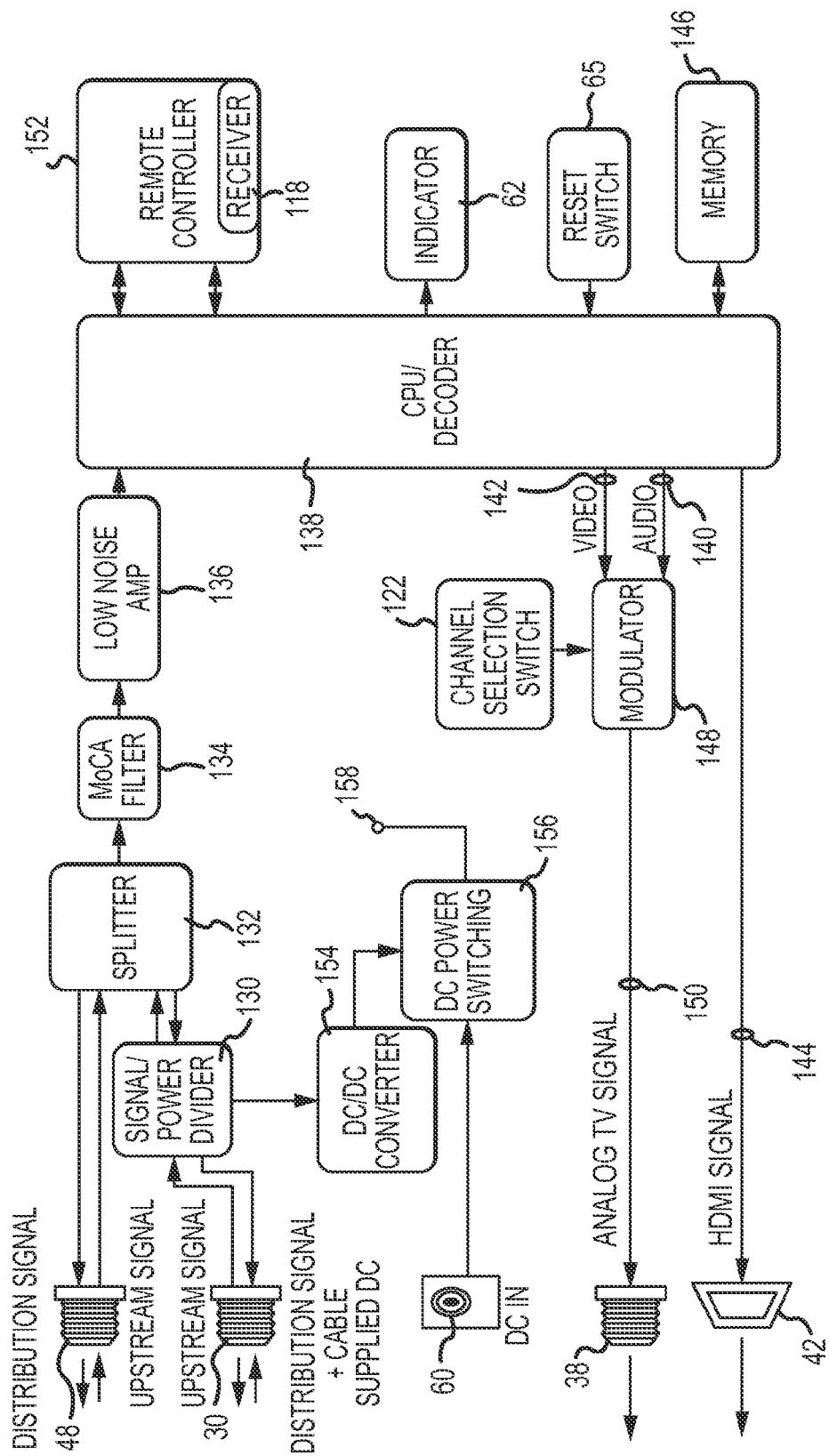
FIG. 8 is a block diagram of internal electronic components within the DTA shown in FIGS. 1-7.

One of the internal electronic components attached to the PCB 36 is a remote controller (152, FIG. 8). A control signal receiver 118 responds to RF control signals from the remote control unit 52 (FIG. 1). The receiver 118 is attached to a dipole antenna 120 that is created by traces formed on the PCB 36. The receiver 118 and the dipole antenna 120 are matters of conventional specification. Of course, an optical remote controller would not use an RF receiver 118 and dipole antenna 120, but instead would use an optical receiver.

A channel selector switch 122 is also attached to the PCB 36. The channel selection switch 122 allows selection of the frequency for delivering the analog TV signals to the analog coaxial connector 38. Typically, the analog TV signals will either be the channel 3 frequency or the channel 4 frequency of a conventional analog TV set. The selected channel frequency depends upon the desired channel for displaying information on the analog TV set 40.

The channel selection switch 122 is attached to either the upper or lower side of the PCB 36. If attached to the upper side of the PCB 36, as shown in FIG. 5, a hole (not shown) is formed in the PCB 36 through which a movable switch element 124 of the switch 122 extends rearward from the PCB 36. The movable switch element 124 is accessible through an opening 126 in the base plate 32, as shown in FIG. 4. Movement of the switch element 122 changes the channel selection of the switch 122. If the channel selection switch 122 is attached to the lower side of the PCB 36 (not shown), there is no need to form a hole through the PCB 36 to accommodate the movable switch element 124, because the movable switch element 124 will extend directly from the channel selection switch into the opening 126 in the base plate 32.

By locating the switch element 124 in the opening 126 on the base plate 32, the channel selection switch 122 cannot be accessed to change its selected channel while the DTA 20 is connected to the wall 22. Preventing access to the channel selection switch 122 in this manner eliminates the possibility that the customer will change the switch selection and by doing so create problems that the signal distribution plant operator will have to remedy with a service call. Since there is no need to gain access to the channel selection switch 122 after the time that the DTA 20 is attached to the wall 22, obscuring the movable switch element 124 by placing it against the wall is not detrimental to the use of the DTA 20.

The other electronic components attached to the PCB 36 are more specifically described in connection with FIG. 8. RF distribution signals and any DC power supplied from the infrastructure coaxial cable 24 (FIG. 2) are applied to the infrastructure coaxial connector 30. A signal/power divider 130 receives both the distribution signals and any DC power supplied over the infrastructure coaxial cable 24 (FIGS. 1 and 2). The signal/power divider 130 separates the distribution signals from any DC power supplied over the cable.

The distribution signals from the signal/power divider 130 are applied to a conventional signal splitter 132. The signal splitter 132 divides the distribution signals into two identical copies. One of the copies is supplied to the pass-through coaxial connector 48. The copy of the distribution signals at the pass-through coaxial connector 48 is the same as the distribution signals available from the infrastructure coaxial cable 24, except that the energy of the distribution signals at the pass-through coaxial connector 48 is typically reduced somewhat because the signal splitter 132 is typically a passive element that consumes some energy in splitting that input signal into the two identical copies. The digital equipment 50 (FIG. 1) connected to the pass-through coaxial connector 48 directly responds to the distribution signals from the infrastructure coaxial cable 24.

Upstream signals from the digital equipment 50 are conducted through the splitter 32 to the signal/power divider 130, and from the signal/power divider 130 to the infrastructure coaxial cable connector 30. The reverse direction of conduction of the upstream signals through the splitter 32 and divider 130 slightly diminishes some amount of energy of the upstream signals, but not to the point of making the upstream signals unusable.

The other copy of the distribution signals from the splitter 132 is applied to a conventional MoCA filter 134. The MoCA filter 134 blocks any MoCA signals that may originate from the digital equipment 50 (FIG. 1) that is connected to the pass-through connector 48. In general terms, a MoCA system is an in-home multimedia entertainment network where entertainment programming is delivered from a source at one node of the in-home network to a receiver located at another node of the in-home network. The entertainment programming is thus available to a user at a location other than the source of that entertainment programming. MoCA uses frequency bands which are different from the frequency band of the distribution signals, the analog TV signal, and the HDMI signals, so it is important to block the MoCA frequency bands from those other signals present in the DTA to avoid creating interference. The MoCA filter 134 accomplishes this purpose by blocking and preventing the MoCA frequency bands from passing through the MoCA filter 134 to the other electronic components shown in FIG. 8.

The copy of the distribution signals supplied from the splitter 132 readily passes through the MoCA filter 134 to a conventional low noise amplifier 136. The low noise amplifier 136 boosts the strength of the distribution signals to a level sufficient for use by a central processing unit/decoder (CPU/decoder) 138.

The CPU/decoder 138 interacts with the amplified distribution signals from the low noise amplifier 136, and processes the digital content information contained in the distribution signals into audio and video signals 140 and 142, respectively, and into HDMI signals 144. Typically, the processing performed by the CPU/decoder 138 involves demodulating the RF distribution signals to extract the digital content information. The digital content information is then supplied as the audio and video signals 140 and 142, and is also supplied in the HDMI format as the HDMI signal 144. A memory 146 contains the programmed instructions necessary to cause the CPU/decoder 138 to perform its functions, including extracting the digital content information from the distribution signals, creating the audio and video signals 140 and 142, and creating and formatting the HDMI signals 144.

The audio and video signals 140 and 142 are modulated by a modulator 148 to create an analog RF TV signal 150 supplied from the analog coaxial connector 38 to the analog TV set 40 (FIG. 1). The modulator 148 creates the TV signal 150 at the channel frequency selected by the channel selection switch 122.

A remote controller 152 is connected to the CPU/decoder 138. The remote controller 152 includes the receiver 118 to receive control signals emitted from the remote control unit 52 (FIG. 1). Selections of the customer are transmitted from the remote controller 52 to the receiver 118, and are converted by the remote controller 152 into control signals that are supplied to the CPU/decoder 138. The CPU/decoder 138 responds to those control signals by selecting the desired information that the customer wishes to view or use from the distribution signals, and then converts that information into the audio and video signals 140 and 142 and the HDMI signal 150, so that the customer can view that programming content.

The CPU/decoder 138 also supplies drive signals to the indicator 62, which preferably includes the LED 114 (FIGS. 5 and 6). Various states of operation and problems that may be encountered by the CPU/decoder 138 are signaled by drive signals supplied from the CPU/decoder 138 to the LED 114. The LED 114 responds to the drive signals by generating patterns and colors of light to indicate various states of operation of the DTA 20.

Power for the electronic components shown in FIG. 8 is derived from cable supplied DC power at the infrastructure coaxial connector 30, or from the external power supply 56 (FIG. 1) at the external power receptacle 60 (FIG. 1). The signal/power divider 130 diverts the DC power present on the infrastructure coaxial connector 30 to a DC to DC converter 154. The DC to DC converter 154 converts the DC power from the infrastructure cable 24 (FIG. 2) into a level appropriate for use by the components shown in FIG. 8.

The DC power from the DC to DC converter 154, and the DC power from the external power supply 56 (FIG. 1) at the power receptacle 60 are applied to a DC power switching circuit 156. The power switching circuit 156 contains the necessary logic to supply one of those two levels of DC electrical power at terminal 158. The DC electrical power at the terminal 158 powers the electronic components of the DTA 20 shown in FIG. 8. The power switching circuit 156 delivers DC power to the terminal 158 from the external power supply 56 (FIG. 1) whenever external DC power is available at the power receptacle 60. Whenever external DC power is not available at the receptacle 60, but DC power from the infrastructure coaxial cable 24 (FIG. 2) is available from the DC to DC converter 154, the DC power switching circuit 156 delivers electrical power from the DC to DC converter 154 at the terminal 158. If power is not available from the power receptacle 60 or from the DC to DC converter 154, no power is applied at 158, and the components shown in FIG. 8 do not function.

Figure 9:
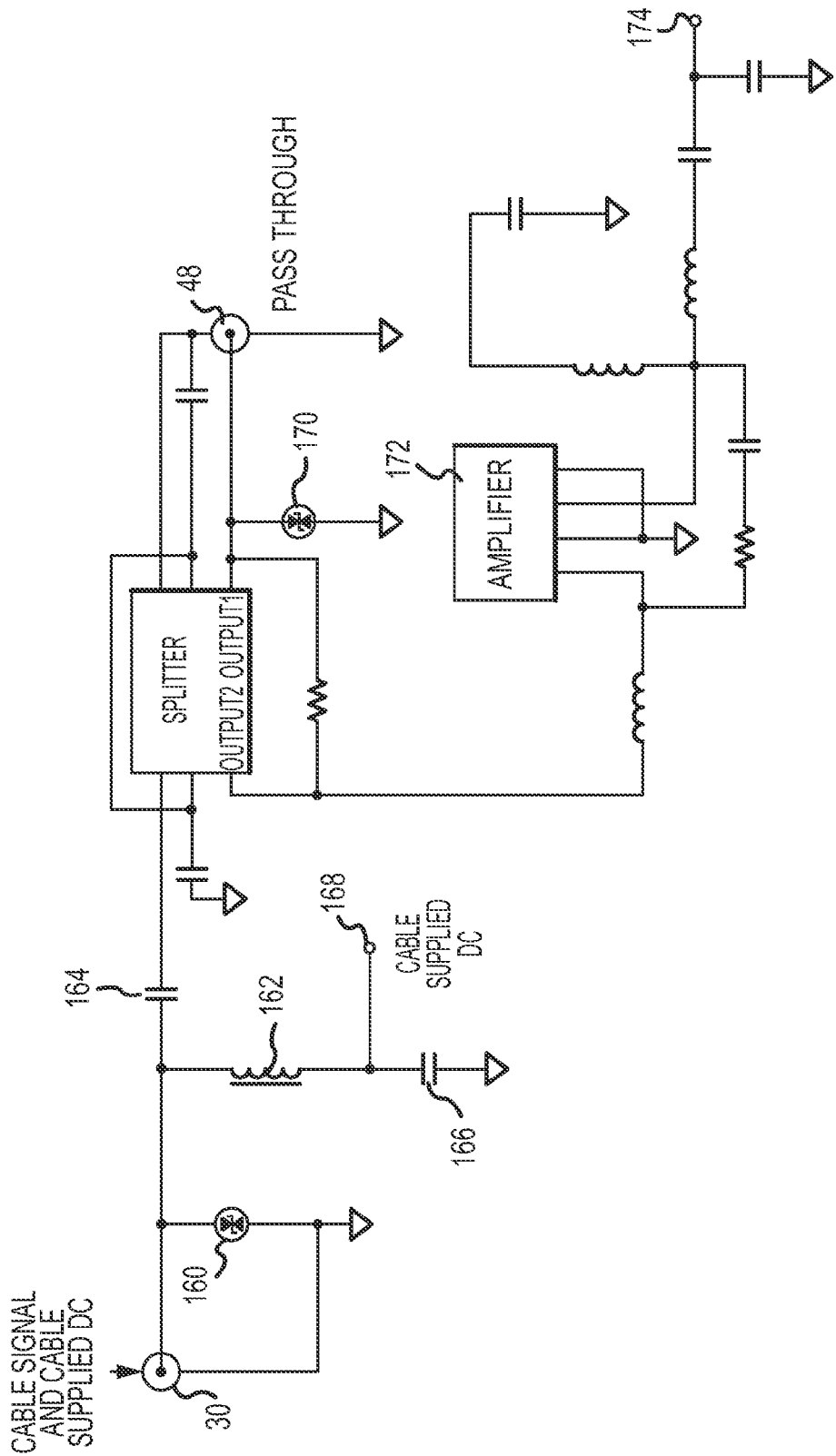
FIGS. 9 and 10 are combination schematic and block diagrams of certain electronic components shown in block diagram form in FIG. 8.

More details of the signal/power divider 130 are shown in FIG. 9. The distribution signals and the cable supplied DC power are received at the infrastructure coaxial connector 30. A positive and negative voltage limitation element 160 inhibits excessive voltage from the infrastructure cable 24 from damaging the electronic components of the DTA 20. Such excessive voltage might arise from a lightning strike to the cable distribution plant, for example. An inductor 162 blocks the passage of the high-frequency distribution signals, and a capacitor 164 blocks the passage of cable supplied DC power. The cable supplied DC power is passed through the inductor 162 where it is filtered by the capacitor 166. Cable supplied DC power is therefore available at the node 168.

The high-frequency distribution signals from the infrastructure coaxial cable 24 pass through the capacitor 164 and is received at an input terminal of the signal splitter 132. The signal splitter 132 divides the input signal into the two identical copies. One copy is conducted from a first output terminal to the pass-through coaxial connector 48. Another positive and negative voltage limitation element 170 is connected to the pass-through coaxial conductor 48, to prevent damage to the internal electronic components of the DTA from excessive voltages.

The other copy of the distribution signals from the signal splitter 132 is conducted through a series of passive frequency filtering elements connected to an amplifier 172. The amplifier 172 restores some of the energy lost when the distribution signals are split by the signal splitter 32. The amplifier 172 is not shown in FIG. 8, but may be considered part of the signal splitter 32. The amplified copy of the distribution signals from the amplifier 172 is conducted through additional passive filtering elements to node 174. The node 174 is connected to an input terminal of the MoCA filter 134, shown in FIG. 8. The copy of the distribution signals which pass through the MoCA filter 134 is amplified by the low noise amplifier 136 and then applied to the CPU/decoder 138.

Figure 10:
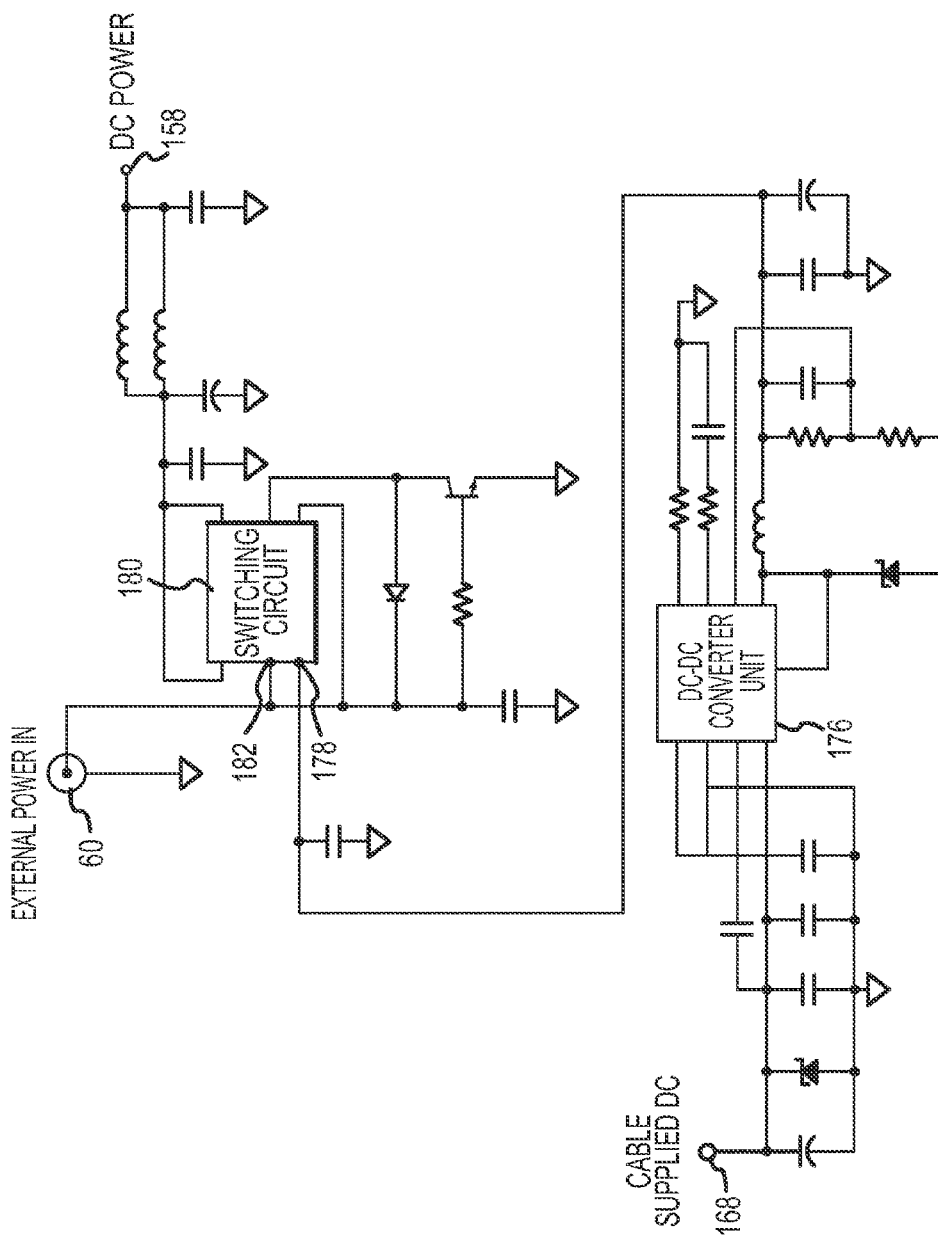

Details concerning the DC to DC converter 154 and the DC power switching circuit 156 are shown in FIG. 10. The cable supplied DC power is present at node 168 and is filtered before being applied to a conventional integrated circuit DC-DC converter unit 176. The DC-DC converter unit 176 is used because of substantial voltage variations which may be experienced on the particular infrastructure coaxial cable 24 to which the DTA 20 is connected, due to the length of the path over which the DC current is conducted before reaching the DTA. In an MDU of significant size, the length of the infrastructure cable 24 leading to the DTA 20 may be several hundreds of feet, and conducting the DC power over that length absorbs power and diminishes the voltage due to the characteristic impedance of the infrastructure coaxial cable 24. The DC-DC converter unit 176 restores the voltage to the desired level for powering the electrical components (FIG. 8). Further filtering of the DC power created by the converter unit 176 is achieved by components before DC power is delivered at terminal 178 of a conventional integrated circuit selection switch circuit 180. The DC power supplied at the terminal 178 is from the DC power derived from the infrastructure cable 24 (FIG. 2).

Power from the external power supply 56 (FIG. 1) at the power receptacle 60 is conducted to another terminal 182 of the selection switch circuit 180. The selection switch circuit unit 180 is a conventional integrated circuit, and it operates to select the external power supplied at terminal 182 and supply that selected power as the DC delivered power at terminal 158 whenever power is present at the terminal 182. Whenever the external power is not present at terminal 182, the selection switch circuit 180 selects the power supplied by the DC-DC converter 154 at terminal 178 for delivery as the DC delivered power 158.

As can be understood from the foregoing description, many significant improvements and advancements are available from the DTA 20. In addition to providing analog TV signals for older analog TV sets, the DTA 20 also directly delivers digital content distribution signals through the pass-through coaxial conductor and delivers HDMI signals through the HDMI connector receptacle. Thus, the DTA delivers digital content RF signals to modern digital equipment and HDMI formatted digital signals to HDMI-compatible equipment, as well as analog TV signals to older analog television sets. The DTA 20 is usable with both modern and older customer equipment, and therefore is more universally usable by a variety of customers.

The DTA 20 is permanently attached to a wall in a room or space where it is used, from the perspective of the customer. Consequently, it is unlikely that the DTA will be mistakenly or intentionally removed, thereby eliminating or reducing the expense of replacement. The cables and connections to the DTA extend parallel to the wall to avoid interfering with the placement of the customer equipment and furniture.

The customer cannot access the channel selection switch 122, thereby eliminating the possibility that the customer will inadvertently change the channel selection switch and cause problems that the signal distribution plant operator will have to remedy with a service call. On the other hand, the indicator 62 provides signals which the customer can interpret and report by telephone to the signal distribution plant operator, to receive instructions for resetting the functionality of the DTA 20 by depressing the conveniently located and guarded reset button 64, again saving the expense of a service call by the distribution plant operator.

DC power for the DTA 20 is received from either an external power supply or from cable supplied DC power, thereby offering more flexibility in locations for use and more reliability in circumstances where commercial power is lost but power is still available over the cable. Relatively long conduction paths of the DC power over the cable do not adversely affect the voltage available at the DTA, because the voltage is established by the DTA at the desired level. Furthermore, selecting and using power from the external power supply eliminates the drain on power otherwise conducted through the cable infrastructure.

The significance of these and other improvements and advantages will become more apparent upon gaining a full appreciation of the ramifications and various aspects of this invention. Preferred embodiments of the invention and many of its improvements have been described with a degree of particularity. The details of the description are directed to preferred examples of implementing the invention. The detailed description is not necessarily intended to limit the scope of the invention. The scope of the invention is defined by the following claims.

The invention claimed is:

1. A digital transport adapter (DTA) adapted for rigid attachment to a wall by at least one fastener which rigidly connects to the wall, the DTA responding to radio frequency digital content information distribution signals conducted by an infrastructure cable of a signal distribution plant, the DTA operatively delivering signals containing the digital content information to customer equipment, the DTA comprising:
    a first connector adapted to connect to the infrastructure cable by which to receive the distribution signals;
    a signal splitter connected to receive the distribution signals from the first connector and to split the distribution signals into a first copy and a second copy;
    a second connector adapted to connect to the customer equipment, the second connector connected to the signal splitter to receive the first copy of the distribution signals and to supply the first received copy to the connected customer equipment;
    electronic components connected to the signal splitter and operative to receive the second copy of the distribution signals and to extract the digital content information from the second copy of the distribution signals, the electronic components responding to the extracted digital content information to create television (TV) signals and high definition multimedia interface (HDMI) signals;
    a third connector adapted to connect to the customer equipment, the third connector connected to the electronic components to receive the TV signals and to supply the TV signals to the customer equipment connected to the third connector; and
    a fourth connector adapted to connect to the customer equipment, the fourth connector connected to the electronic components to receive the HDMI signals and to supply the HDMI signals to the customer equipment connected to the fourth connector;
    a base plate having a structural configuration adapted to connect to the one fastener to rigidly attach the base plate to the wall;
    an exterior cover which rigidly attaches to the base plate and which overlies the one fastener;
    the base plate and the exterior cover define an interior space within which the signal splitter and the electronic components are located; and
    a printed circuit board located between the base plate and the exterior cover within the interior space, the signal splitter and the electronic components connected to the printed circuit board; and wherein:
    the electronic equipment includes a light-emitting indicator which signals a status of operation of the electronic components, the light emitting indicator comprising a light emitting diode connected to the printed circuit board; and
    the exterior cover includes an opening through which signals from the light emitting indicator are perceivable.

2. A DTA as defined in claim 1, wherein the customer equipment connected to the second connector is digital equipment which is capable of initiating upstream signals compatible with the distribution signals conducted by the signal distribution plant, and wherein:
  the second connector is also adapted to receive the upstream signals from the customer equipment connected to the second connector and to supply the upstream signals to the signal splitter;
  the signal splitter conducts the upstream signals to the first connector; and
  the first connector supplies the upstream signals to the infrastructure cable for delivery to the signal distribution plant.

3. A DTA as defined in claim 1, wherein the wall includes a wall connection box within which an end of the infrastructure cable is located, and wherein:
  the one fastener extends between the wall connection box and the base plate to rigidly attach the base plate to the wall in a position which overlies the wall connection box;
  the first connector is connected to the base plate in a position to extend into the wall connection box when the base plate is rigidly attached to the wall in the position which overlies the wall connection box;
  the first connector connects to the end of the infrastructure cable within the wall connection box;
  the second, third and fourth connectors are retained rigidly relative to the base plate; and
  the exterior cover exposes the second, third and fourth connectors for access to connect the customer equipment.

4. A DTA as defined in claim 3, wherein:
  the base plate includes an end portion that extends at an angle approximately perpendicularly to the wall when the base plate is rigidly attached to the wall;
  the end portion of the base plate forms a bottom side of the DTA when the base plate is rigidly attached to the wall;
  the second and third connectors are connected to the end portion of the base plate; and
  the exterior cover extends around the end portion of the base plate.

5. A DTA as defined in claim 4, wherein:
  the exterior cover defines at least one longitudinal side of the DTA when the base plate is rigidly attached to the wall; and
  the fourth connector is positioned for access at one longitudinal side of the DTA.

6. A DTA as defined in claim 5, further comprising:
  a reset switch positioned to be accessible at one longitudinal side of the DTA; and wherein:
  the one longitudinal side of the DTA which provides access to the reset switch comprises a recess formed into the one longitudinal side by which to access the reset switch; and
  the reset switch is connected to the electronic components to send a signal for reinitiating functionality of the electronic components.

7. A DTA as defined in claim 4, further comprising:
  a power receptacle connected to the end portion of the base plate, the power receptacle adapted to receive external electrical power for the electronic components.

8. A DTA as defined in claim 4, wherein:
  the rigid attachment of the exterior cover to the base plate comprises:
  a plurality of projections formed on the exterior cover which overlap edges of the base plate at locations adjacent the wall when the base plate is rigidly attached to the wall; and
  an extension of the exterior cover which extends into the interior space and connects to and is retained rigidly to the wall by the one fastener.

9. A DTA as defined in claim 4, wherein the rigid attachment of the exterior cover to the base plate comprises:
  a tab extending from the exterior cover into adjacency with the end portion of the base plate;
  a hook-like projection extending from the tab in a direction toward the interior space; and
  a hole formed in the end portion of the base plate in alignment to receive the hook-like projection when the exterior cover is rigidly attached to the base plate.

10. A DTA as defined in claim 3, wherein:
  the electronic components include a selection switch having a movable element for operating the selection switch;
  the base plate includes an opening which is located facing the wall when the base plate is rigidly attached to the wall in the position which overlies the wall connection box; and
  the selection switch is retained relative to the base plate to position the movable switch element within the opening for movement to operate the selection switch and to make the movable switch element inaccessible for movement when the base plate is rigidly attached to the wall.

11. A DTA as defined in claim 10, wherein:
  the TV signals are analog TV signals;
  the electronic equipment comprises a modulator for establishing a frequency of the analog TV signals at a selected one of a plurality of different channel frequencies;
  the selection switch is connected to the modulator to select one of the plurality of different analog TV channel frequencies in accordance with the position of the movable switch element in the opening of the base plate; and
  the position of the movable switch element within the opening) establishes the selected channel frequency at which the analog TV signals are created.

12. A DTA as defined in claim 3, and wherein:
  the base plate includes a keyhole-shaped retention opening and a circular-shaped retention opening;
  the keyhole-shaped opening is adapted to receive a first fastener which extends from the wall connection box into the keyhole-shaped retention opening to retain the base plate to the wall overlying the wall connection box; and
  the circular-shaped retention opening is adapted to receive a second fastener which extends from the wall connection box into the circular-shaped retention opening to rigidly retain the base plate to the wall overlying the wall connection box.

13. A DTA as defined in claim 1, wherein the infrastructure cable carries cable-delivered electrical power in addition to the distribution signals, and wherein the DTA further comprises:
  a power receptacle connected to the end portion of the base plate, the power receptacle adapted to receive external electrical power for the electronic components; and wherein the electronic components further comprise:
  a divider connected to the first connector to receive the cable-delivered electrical power and the distribution signals from the infrastructure cable, the divider separating the cable-delivered electrical power from the distribution signals, the divider supplying distribution signals to the splitter; and
  a power switching circuit connected to the divider to receive cable-delivered power and connected to the power receptacle to receive external electrical power, the power switching circuit operative to supply the external electrical power to the electronic components whenever external electrical power is available at the power receptacle and to supply the cable-delivered power to the electronic components whenever external electrical power is not available at the power receptacle.

14. A DTA as defined in claim 13, wherein the electronic components further comprise:
a converter connected to the divider to receive the cable-delivered power from the divider, the converter operatively adjusting the cable-delivered power to a level different from a level of the cable-delivered power received at the first connector and separated by the divider; and wherein:
the power switching circuit receiving the adjusted level of cable-delivered power and supplying the adjusted level of the cable-delivered power to the electronic components whenever external electrical power is not available at the power receptacle.

15. A DTA as defined in claim 14, wherein the cable-delivered power is DC power and the cable delivered power available at the first connector and divider has a variable voltage which is related to a length of the infrastructure cable, and wherein:
the converter comprises a DC to DC converter which is operative create DC power at a predetermined voltage from the cable-delivered power of variable voltage; and
the adjusted level of the cable-delivered power is DC power at the predetermined voltage.

16. A DTA as defined in claim 1, further comprising:
a sleeve connected to the cover and extending from the cover toward the printed circuit board, the sleeve having an interior opening through the exterior cover, the sleeve surrounding the light emitting diode with the light emitting diode located within the interior of the sleeve; and
a lens located adjacent to the exterior cover for condensing light from the light emitting diode within the interior of the sleeve for projection in a direction exteriorly from the exterior cover.

17. A DTA as defined in claim 2, wherein the infrastructure cable is a coaxial cable, and wherein:
the first, second and third connectors are coaxial cable connectors; and
the fourth connector is an HDMI connector receptacle.

18. A digital transport adapter (DTA) responsive to radio frequency digital content information distribution signals and cable-delivered electrical power conducted by an infrastructure coaxial cable of a signal distribution plant, the DTA is adapted for rigid attachment to a wall by at least one fastener which rigidly connects to the wall, the wall including a wall connection box within which an end of the infrastructure coaxial cable is located, the DTA operatively delivering signals containing the digital content information to an analog television (TV) set and to digital customer equipment that receives distribution signals from the signal distribution plant and sends upstream signals to the signal distribution plant and to high definition multimedia interface (HDMI) compatible equipment, the DTA comprising:
a base plate having a structural configuration adapted to connect to the one fastener to rigidly attach the base plate to the wall in a position which overlies the wall connection box:
an exterior cover which rigidly attaches to the base plate and which overlies the one fastener, the exterior cover defining at least one longitudinal side of the DTA when the base plate is rigidly attached to the wall, the exterior cover and the base plate defining an interior space when the exterior cover is attached to the base plate;
an infrastructure coaxial cable connector adapted to connect to the infrastructure coaxial cable by which to receive the distribution signals and the cable-delivered electrical power, the infrastructure coaxial cable connector supplying the upstream signals to the infrastructure cable for delivery to the signal distribution plant, the infrastructure coaxial cable connector connected to the base plate in a position to extend into the wall connection box when the base plate is rigidly attached to the wall in the position which overlies the wall connection box, the infrastructure coaxial cable connector also connecting to the end of the infrastructure cable within the wall connection box;
a divider connected to the infrastructure coaxial cable connector to receive the cable-delivered electrical power and the distribution signals, the divider separating the cable-delivered electrical power and the distribution signals and supplying the cable-delivered electrical power separate from the distribution signals, the divider also conducting the upstream signals to the infrastructure coaxial cable connector;
a signal splitter connected to receive the distribution signals from the divider, the signal splitter splitting the distribution signals into a first copy and a second copy, the signal splitter also conducting the upstream signals to the divider;
a pass through coaxial cable connector adapted to connect to the customer equipment, the pass-through coaxial cable connector connected to the signal splitter to receive the first copy of the distribution signals and to supply the first received copy to the connected customer equipment, the pass-through coaxial cable connector also adapted to receive the upstream signals from the customer equipment connected to the second connector and to supply the upstream signals to the signal splitter, the pass-through coaxial cable connector connected to the base plate;
a power receptacle connected to the base plate, the power receptacle adapted to receive external electrical power;
a power switching circuit connected to the divider to receive cable-delivered power and connected to the power receptacle to receive external electrical power, the power switching circuit operative to supply the external electrical power to power consuming electronic components of the DTA whenever external electrical power is available at the power receptacle and to supply the cable-delivered power to power the power consuming electronic components of the DTA whenever external electrical power is not available at the power receptacle;
a central processing unit (CPU)/decoder connected to the signal splitter to receive the second copy of the distribution signals, the CPU/decoder operatively extracting the digital content information from the second copy of the distribution signals and responding to the extracted digital content information to create analog TV signals for use by the analog TV set and to create HDMI signals for use by the HDMI compatible equipment;
a selection switch having a movable element for operating the selection switch, the movable switch element positioned for movement within an opening in the base plate which is located facing the wall when the base plate is rigidly attached to the wall in the position which overlies the wall connection box to make the movable switch element inaccessible for movement when the base plate is rigidly attached to the wall;

a modulator for establishing a frequency of the analog TV signals at a selected one of a plurality of different channel frequencies, the modulator connected to the selection switch to select one of the plurality of different analog TV channel frequencies in accordance with the position of the movable switch element in the opening of the base plate;

a reset switch connected to the base plate in a position to be accessible from the exterior of the DTA, the reset switch is connected to the CPU/decoder to send a signal for reinitiating functionality of the CPU/decoder;

an analog coaxial cable connector adapted to connect to the analog TV set, the analog coaxial cable connector connected to the base plate, the analog coaxial cable connector connected to the modulator to receive the analog TV signals at the selected channel frequency and to supply the analog TV signals at the selected channel frequency to the connected analog TV set; and a HDMI connector adapted to connect to the HDMI compatible equipment, the HDMI connector connected to the base plate, the HDMI connector connected to the CPU/decoder to receive the HDMI signals and supply the HDMI signals to the connected HDMI compatible equipment; and wherein:

the divider, signal splitter, power switching circuit, CPU/decoder, selection switch, modulator and reset switch are positioned within the interior space; and the pass-through and analog coaxial cable connectors and the HDMI connector and the reset switch are each positioned to be accessible at the exterior of the DTA when the exterior cover is attached to the base plate and the base plate is attached to the wall in the position which overlies the wall connection box.

19. A DTA as defined in claim 18, wherein the cable-delivered power is DC power and the cable delivered power available at the infrastructure coaxial cable connector has a variable voltage which is related to a length of the infrastructure cable, the DTA further comprising:

a converter connected to the divider to receive the cable-delivered power from the divider, the converter operatively adjusting the voltage of the cable-delivered power to a predetermined voltage level different from the voltage level of the cable-delivered power received at the infrastructure coaxial cable connector; and the power switching circuit receiving the cable-delivered power at the predetermined adjusted voltage level and supplying the predetermined adjusted voltage level of the cable-delivered power to the power consuming electronic components of the DTA whenever external electrical power is not available at the power receptacle.

20. A DTA as defined in claim 18, wherein the attachment of the exterior cover to the base plate comprises:

a plurality of projections formed on the exterior cover which overlap edges of the base plate at a location adjacent the wall when the base plate is rigidly attached to the wall;

an extension of the exterior cover into the interior space which connects to and is retained rigidly to the wall by the one fastener;

a tab extending from the exterior cover into adjacency with the base plate;

a hook-like projection extending from the tab; and a hole formed in the base plate in alignment to receive the hook-like projection when the exterior cover is rigidly attached to the base plate.

21. A DTA as defined in claim 18, further comprising:

a remote controller connected to the CPU/decoder and positioned within the interior space, the remote controller responding to control signals emitted by a remote control unit to cause the CPU/decoder to select desired information from the second copy of the distribution signals and to supply that desired information as at least one of the analog TV signals or the HDMI signals.

22. A DTA as defined in claim 1, wherein the electronic equipment further comprises:

a remote controller connected to the PCB board and positioned within the interior space, the remote controller responding to control signals emitted by a remote control unit to cause the extraction of selected digital content information from the second copy of the distribution signals to create the TV signals and the HDMI signals.

* * * * *